United States Patent [19]
Oisugu

[11] 3,713,762
[45] Jan. 30, 1973

[54] APPARATUS FOR THE EXTRUSION MOLDING OF FOAMABLE PLASTICS

[75] Inventor: Shozo Oisugu, Ohmiya-shi, Saitama-ken, Japan

[73] Assignee: C. I. Kasei Co., Ltd., Tokyo, Japan

[22] Filed: June 18, 1971

[21] Appl. No.: 154,413

[30] Foreign Application Priority Data

June 26, 1970 Japan ................................45/63073

[52] U.S. Cl.................425/197, 425/461, 425/817 C
[51] Int. Cl. .............................................B29h 7/20
[58] Field of Search......425/4, 133, 461, 464, 817 C, 425/197; 264/47

[56] References Cited

UNITED STATES PATENTS 3,327,030  6/1967  Reifenhauser..........................264/47
3,608,145  9/1971  Baker et al....................425/817 C X
3,624,192  11/1971  McCoy et al. .......................425/4 X

FOREIGN PATENTS OR APPLICATIONS 392,867  10/1965  Switzerland........................425/133

Primary Examiner—R. Spencer Annear
Attorney—Woodhams, Blanchard and Flynn

[57] ABSTRACT

Apparatus for the extrusion molding of foamable plastics which produces a smooth and sturdy surface on the extruded product by covering plastic material which has foamed in a central expansion passage with the plastic material which has been restrained from foaming in an outer, narrow surrounding passage which is of substantially constant cross-sectional area throughout its length.

10 Claims, 5 Drawing Figures

PATENTED JAN 30 1973 3,713,762

INVENTOR.
SHOZO OTSUGU
BY
Woodhams, Blanchard & Flynn
ATTORNEYS

APPARATUS FOR THE EXTRUSION MOLDING OF FOAMABLE PLASTICS

FIELD OF THE INVENTION

This invention relates to extrusion molding apparatus for producing foamed thermoplastic products and more particularly relates to apparatus of such type capable of producing products having a smooth appearance.

BACKGROUND OF THE INVENTION

A disadvantage of prior extrusion molding devices for foamable plastics is that the quality and appearance of the extruded products produced thereby are seriously damaged because of the structure of such prior devices. In such prior devices, foamable thermoplastic material is typically extruded by a screw through a breaker plate into an opening in a metal extrusion die. The foamable thermoplastic material foams and thus expands in the metal die, which causes the material to flow at a slower rate in the radially outer part of the opening, near the surface of the metal die, than in the central part of the opening. This allows the material which has foamed in the central part of the opening to expand to the radially outer part of the opening, and to damage the smooth appearance of the product due to the rupturing or breaking of the surface layer of the product by the thus foamed material, which damage may occur when the product has been extruded out of the opening. When a torpedo is used, the quality and appearance of the molded product are also seriously damaged, since the torpedo cannot restrain the foamable material from foaming at the surface, though it enables it to foam toward the central part.

The present invention has been made to avoid such disadvantages of the prior art.

Thus, it an object of this invention to provide extrusion molding apparatus for foamable plastics capable of producing products having a smooth appearance.

It is a further object of this invention to provide an apparatus, as aforesaid, wherein foaming thermoplastic material in the interior portion of the extruded plastic mass is prevented from reaching the outer surface of the product.

It is a further object of this invention to provide apparatus, as aforesaid, in which the surface of the product is defined by a layer of plastic material which has been restrained from foaming during the extrusion process and which contains an inner mass of foamed material.

Other objects and purposes of this invention will be apparent to persons acquainted with apparatus of this general type upon reading the following specification and inspecting the accompanying drawings.

SUMMARY OF THE INVENTION

The objects and purposes of the invention are met by providing a hollow extrusion die and means for feeding a foamable thermoplastic material thereto through a breaker plate. An induction tube is located within the hollow extrusion die between the breaker plate and the outlet opening of the die. The tube has a central passage which expands radially toward the outlet opening of the die. The outer surface of the induction tube is spaced from the inner surface of the hollow die to define a radially narrow, circumferential passage therebetween. Means are provided for supporting the tube in fixed relation to the die near the breaker plate and said means is provided with a plurality of small, circumferentially spaced orifices in communication with the circumferential passage between the tube and die so that plastic passing through the breaker plate divides into a first flow which passes through and foams in the central passage of the tube and a second flow which passes through the orifices and circumferential passage wherein foaming is inhibited, the two flows joining in the outlet opening of the die to provide a central foamed product portion and an integral exterior covering layer of substantially unfoamed or less completely foamed material.

DETAILED DESCRIPTION

Figure 1:
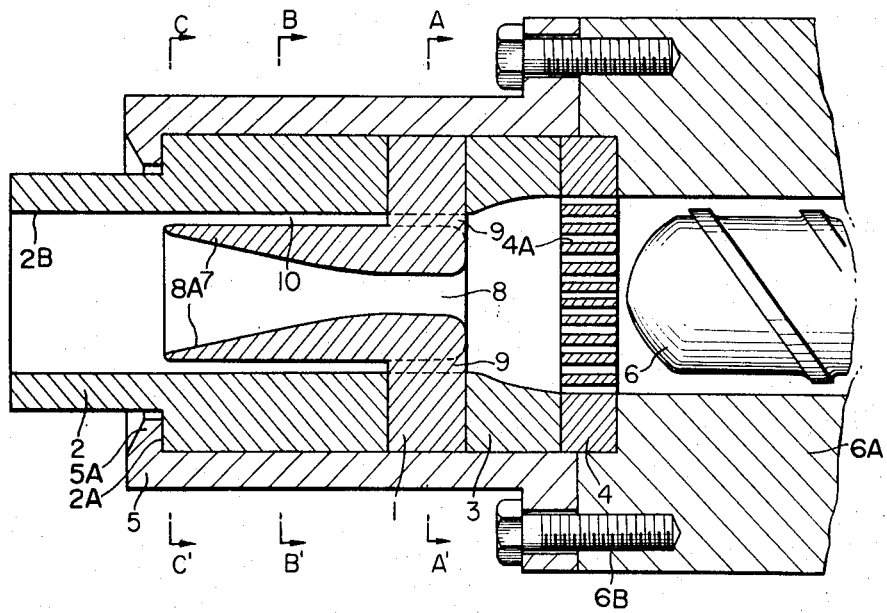
FIG. 1 is a central cross-sectional view of the principal part of one embodiment of the present invention.
Figure 2:
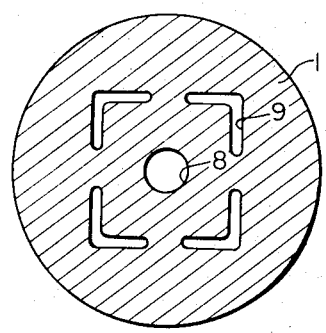
FIG. 2 is a cross-sectional view taken on the line A—A' of FIG. 1.
Figure 3:
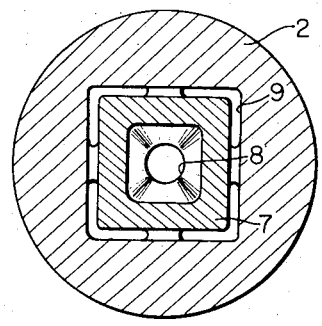
FIG. 3 is a cross-sectional view taken on the line B—B' of FIG. 1.
Figure 4:
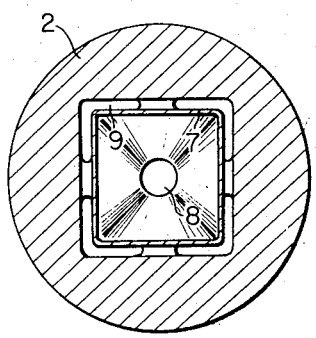
FIG. 4 is a cross-sectional view taken on the line C—C' of FIG. 1.

FIG. 1 discloses a preferred embodiment of the invention in which an extrusion die assembly is provided which comprises auxiliary die part or mold element 1 snugly and coaxially sandwiched between a hollow extrusion mold or die 2 and a hollow adapter ring 3, all snugly circumferentially surrounded by a cylindrical, shell-like holder 5. At least the auxiliary die part 1 and extrusion die 2 are of metal. A multiperforate breaker plate 4 abuts the rightward or input end of the adapter ring 3 and is partly housed by the holder 5. A radially inwardly extending flange 5A at the leftward end of the holder 5 coacts with a shoulder 2A intermediate the ends of the extrusion die 2 for preventing movement of the extrusion die 2, auxiliary die part 1, adapter ring 3 and breaker plate 4 leftwardly with respect to the holder 5. A source of foamable thermoplastic material under pressure is provided and in the particular embodiment shown comprises a conventional extrusion screw 6 disposed to the right of the breaker plate 4. The screw 6 is coaxially aligned with the extrusion die 2, auxiliary die part 1, adapter 3 and breaker plate 4. The extrusion screw 6 is conventionally disposed for rotation within a housing 6A, the leftward end of which is recessed for receiving a portion of the breaker plate 4 and bears firmly against the rightward end of the holder 5. The holder 5 is rigidly fixed to the housing 6A by screws 6B extending through a flange on the rightward end of the holder 5.

An induction tube 7 is preferably coaxially located in the extrusion die 2, the rightward end of the induction tube 7 being preferably integrally connected with the auxiliary die part 1, the auxiliary die part 1 extending as a radial flange outwardly therefrom. A central or inner passage 8 extends through the induction tube 7, the leftward end 8A of the central passage 8 spreading or diverging smoothly to the leftward end of the tube 7 whereat it communicates with the output opening 2B defined by the leftward end of the hollow interior of the extrusion die 2. The inner surface of the hollow extrusion die 2 is narrowly, radially spaced outwardly from the outer surface of the induction tube 7 to define a radially narrow annular or circumferential passage 10 which extends from the flange 1 leftwardly to the end of the induction tube 7 where it communicates with the outlet opening 2B. The circumferential passage 10 is preferably of substantially constant cross-sectional area throughout its length and its preferably coaxial with the central passage 8. In the particular embodiment shown, the passage 10 is of substantially square cross section as is the interior of the outlet opening 2B of the extrusion die. However, it is contemplated that such shape may be changed as desired depending on the desired cross-sectional shape of the extruded product.

Figure 5:
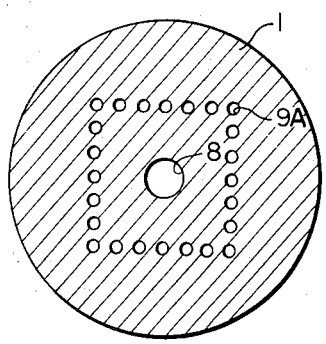
FIG. 5 is a view of a modified embodiment, corresponding to FIG. 2.

A plurality of small outer orifices 9 extend through the flange 1 in axial alignment with the annular passage 10 and communicate between the interior of the hollow adapter ring 3 and the passage 10. The orifices 9 are preferably evenly circumferentially spaced with respect to the induction tube 7 and in the embodiment of FIGS. 1-4 are of substantially L-shaped cross-section, there being four of such orifices provided, one at each peripheral corner of the induction tube 7. However, it is contemplated that these outer orifices may take various shapes and distributions, a further variation being shown, by way of example, in FIG. 5 wherein an increased number of orifices 9A of reduced and circular cross-section are provided in substantially even distribution around the periphery of the induction tube 7.

OPERATION

Although the operation of the mechanism described above will be understood from the foregoing description by skilled persons, a summary of such description is now given for convenience.

With reference to FIG. 1, foamable thermoplastic material extruded by the screw 6 flows, under pressure, leftwardly through the perforations 4A in the breaker plate and into the interior of the adaptor ring 3. A portion of the material flows leftwardly into and through the central passage 8, the remaining portion flowing leftwardly through the small outer orifices 9 into the circumferential passage 10. The plastic material in the central passage 8 is allowed to foam as it moves leftwardly toward the outlet end of the central passage 8 along the divergent portion 8A thereof. Conversely, the plastic material which has entered the narrow circumferential passage 10, of unvarying cross-sectional area, through the small outer orifices 9, is restrained from foaming because of the material's flow resistance which is large enough to suppress the foaming pressure. As the central passage 8 and narrow annular passage 10 join at the leftward end of the induction tube 7, the plastic material which has foamed in a diffusive way in the central passage 8 is extruded leftwardly out of the extrusion die 2 while being peripherally covered by the plastic material which has been restrained from foaming in the narrow circular passage 10.

As a result, the surface of the product extruded out of the die 2 is smooth and sturdy. The fact that the aforesaid different behavior of the portions of the material in the two passages 8 and 10 takes place independently from each other on the inside and outside of the induction tube 7 and the fact that the two portions of the material are connected together near the outlet opening 2B of the extrusion die 2 ensures that the portion of the material which has been allowed to foam freely in the central passage 8 does not expand to the outer portion of the die opening 2B. Thus, a well-shaped product with a smooth and sturdy surface can be obtained.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. Apparatus for the extrusion molding of a foamable plastic material, comprising in combination:
    a hollow extrusion die having an elongated central chamber with an outlet at one end thereof;
    an induction tube disposed within said central chamber, said tube having an inner passage extending therethrough, said passage being of progressively larger cross-sectional area toward said outlet of said extrusion die, the outer surface of said induction tube being spaced from the wall of said central chamber to define a narrow circumferential passage therebetween for dividing a flow of plastic material into an inner and an outer portion and for inhibiting foaming in said circumferential passage, said circumferential passage and said inner passage being joined together before said outlet of said die for joining said inner and outer portions of said plastic material;
    communicating means for providing communication of the ends of said inner passage and said circumferential passage remote from said outlet with a source of foamable thermoplastic material.

2. The device defined in claim 1 in which said circumferential passage completely encompasses said tube and is of substantially constant cross-sectional area throughout its length.

3. The device defined in claim 1 in which said communicating means includes means interposed between said tube and the wall of said chamber and located axially along said tube adjacent the input end thereof for defining a plurality of small orifices communicating between said source of material and the input end of said circumferential passage.

4. The device defined in claim 3 in which said orifices constitute four generally L-shaped cross-section openings and said circumferential passage has the cross-sectional shape of substantially a hollow square, said orifices being located adjacent the corners of said circumferential passage.

5. The device defined in claim 3 in which said circumferential passage is of substantially hollow square cross-section and said orifices comprise a plurality of axially extending holes communicating with each of the four sides of said circumferential passage.

6. The device defined in claim 1 in which the thickness of said circumferential passage is selected to resist the flow of the plastic material therethrough sufficiently to suppress the foaming pressure thereof and so restrain such material from foaming while passing through said circumferential passage.

7. The device defined in claim 1 including a multiperforate breaker plate spaced by means defining an intervening chamber from the inlet ends of said circumferential passage and said inner passage, said breaker plate being interposed between said source of material supply and said induction tube.

8. The device defined in claim 1 in which said inner passage has a first, material input portion which is elongated and of substantially constant cross-section and a further and elongated output portion which is of substantially uniformly increasing cross-section to allow uniform expansion of material passing therethrough due to foaming of such material, the output end of said increasing cross-section portion of said inner passage lying closely adjacent the output end of said circumferential passage for allowing smooth and rapid contact of foamed material from said inner passage with substantially unfoamed material leaving said circumferential passage.

9. The device defined in claim 1 including a radial flange extending outwardly from said tube adjacent the material input end thereof and a hollow adaptor ring coaxially located with respect to said tube and said die, said flange being axially disposed between said ring and said die and being provided with a plurality of substantially evenly circumferentially spaced small orifices extending axially therethrough and communicating between the interior of said hollow ring and said input end of said circumferential passage, a shell-like holder surrounding said die, said flange and said adapter ring for holding same in coaxially aligned relationship, said source of material comprising an extrusion screw substantially axially aligned with said tube and disposed within a hollow housing, means for rigidly connecting said shell-like holder to the output end of said screw housing and a multiperforate breaker plate interposed between said screw housing and said adapter ring whereby said screw extrudes foamable plastic material through said multiperforate breaker plate and through said hollow ring, one portion of said flow of material passing through said orifices and circumferential passage and the remainder of said material passing through said inner passage, the material flowing in said circumferential passage being constrained from foaming and the material in said inner passage being allowed to foam as it exits therefrom, the two portions of material combining to flow out of said extrusion die to form a product having an unfoamed or less completely foamed exterior portion and a more completely foamed interior portion.

10. The device defined in claim 1 in which the interior of said die and the exterior of said tube are substantially of square cross-section and wherein the input end of said inner passage is of circular cross-section while the output end thereof is of substantially square cross-section.

* * * * *